(12) United States Patent
Peisker et al.

(10) Patent No.: US 7,470,446 B2
(45) Date of Patent: Dec. 30, 2008

(54) METHOD AND SYSTEM FOR SUPPLYING AMINO ACIDS OR CHEMICAL DERIVATIVES IN LIQUID FORM TO RUMINANT LIVESTOCK

(75) Inventors: Manfred Peisker, Idstein (DE); Giuseppe Baricco, Turin (IT)

(73) Assignee: Archer-Daniels-Midland Company, Decatur, IL (US)

( * ) Notice: Subject to any disclaimer, the term of this patent is extended or adjusted under 35 U.S.C. 154(b) by 729 days.

(21) Appl. No.: 11/061,240

(22) Filed: Feb. 18, 2005

(65) Prior Publication Data

US 2005/0145185 A1 Jul. 7, 2005

Related U.S. Application Data

(62) Division of application No. 09/922,939, filed on Aug. 7, 2001, now Pat. No. 6,874,444.

(30) Foreign Application Priority Data

Aug. 8, 2000 (IT) .............................. 2000A0785

(51) Int. Cl.
A23J 1/00 (2006.01)
(52) U.S. Cl. ...................................... 426/656; 426/807
(58) Field of Classification Search ................. 426/656, 426/807
See application file for complete search history.

(56) References Cited

U.S. PATENT DOCUMENTS

| | | | |
|---|---|---|---|
| 3,437,075 A | 4/1969 | Hawes et al. | |
| 4,181,709 A | 1/1980 | Dannelly | |
| 4,777,051 A | 10/1988 | Nagano et al. | |
| 4,789,686 A | 12/1988 | Giraud | |
| 4,820,527 A * | 4/1989 | Christensen et al. | 426/2 |
| 4,865,227 A * | 9/1989 | Stephens | 222/135 |
| 4,919,945 A | 4/1990 | Spindler et al. | |
| 5,133,976 A | 7/1992 | Ruoy | |
| 5,244,681 A * | 9/1993 | Vinci et al. | 426/72 |
| 5,622,710 A | 4/1997 | Binder et al. | |
| 6,017,563 A | 1/2000 | Knight et al. | |
| 6,126,972 A * | 10/2000 | Korfer et al. | 426/2 |
| 6,183,786 B1 | 2/2001 | Knight et al. | |
| 6,199,512 B1 | 3/2001 | Jefferson et al. | |
| 6,238,714 B1 | 5/2001 | Binder et al. | |
| 6,340,486 B1 | 1/2002 | Binder et al. | |
| 6,874,444 B2 * | 4/2005 | Peisker et al. | 119/74 |
| 7,318,943 B2 * | 1/2008 | Baricco et al. | 426/656 |

FOREIGN PATENT DOCUMENTS

| | | |
|---|---|---|
| EP | 0 122 163 B2 | 10/1984 |
| EP | 0 253 740 | 1/1988 |
| EP | 0 491 638 A2 | 6/1992 |
| EP | 0 533 039 B1 | 3/1993 |
| EP | 0 615 693 B1 | 9/1994 |
| EP | 1 005 788 | 6/2000 |
| FR | 2 709 120 | 2/1995 |
| WO | WO 85/02323 | 6/1985 |
| WO | WO 93/10667 | 6/1993 |

OTHER PUBLICATIONS

Fox, D.G., et al., "A Net Carbohydrate and Protein System for Evaluating Cattle Diets: III. Cattle Requirements and Diet Adequacy," J. Anim. Sci. 70:3578-3596, American Society of Animal Science (1992).*
Galligan et al. J. Dairy Sci., vol. 69, pp. 1636-1664, 1986.*
Dialog File 351: Derwent WPI, English language abstract of EP 0 253 740 (Document AL2), WPI, Accession No. 1988-016059/198803.
Dialog File 351: Derwent WPI, English language absract of FR 2 709 120 (Document AN2), WPI Accession No. 1995-100552/199514.

* cited by examiner

*Primary Examiner*—C. Sayala
(74) *Attorney, Agent, or Firm*—Buchanan Ingersoll & Rooney PC; Craig G. Cochenour; Bryan H. Opalko

(57) ABSTRACT

A method and system for supplying increased bio-available quantities of amino acids or chemical derivatives in liquid form to ruminant livestock. The method includes supplying a liquid, supplying at least one amino acid, producing a liquid mixture by mixing the liquid with the amino acid(s), and administering the liquid mixture to ruminant livestock drink supply in a controlled manner. The system of the present invention may include a fluid supply line (2), a one-way valve (1) connected to the line (2), a measurement device (3) connected to the line (2) downstream from the one-way valve (1), a pump (5) for injecting amino acids into the fluid system, and containers (9, 9') for retaining the amino acids which are drawn up by appropriate devices (11, 11') and are introduced into the flow of liquid towards drinking troughs (7).

10 Claims, 1 Drawing Sheet

Figure 1:
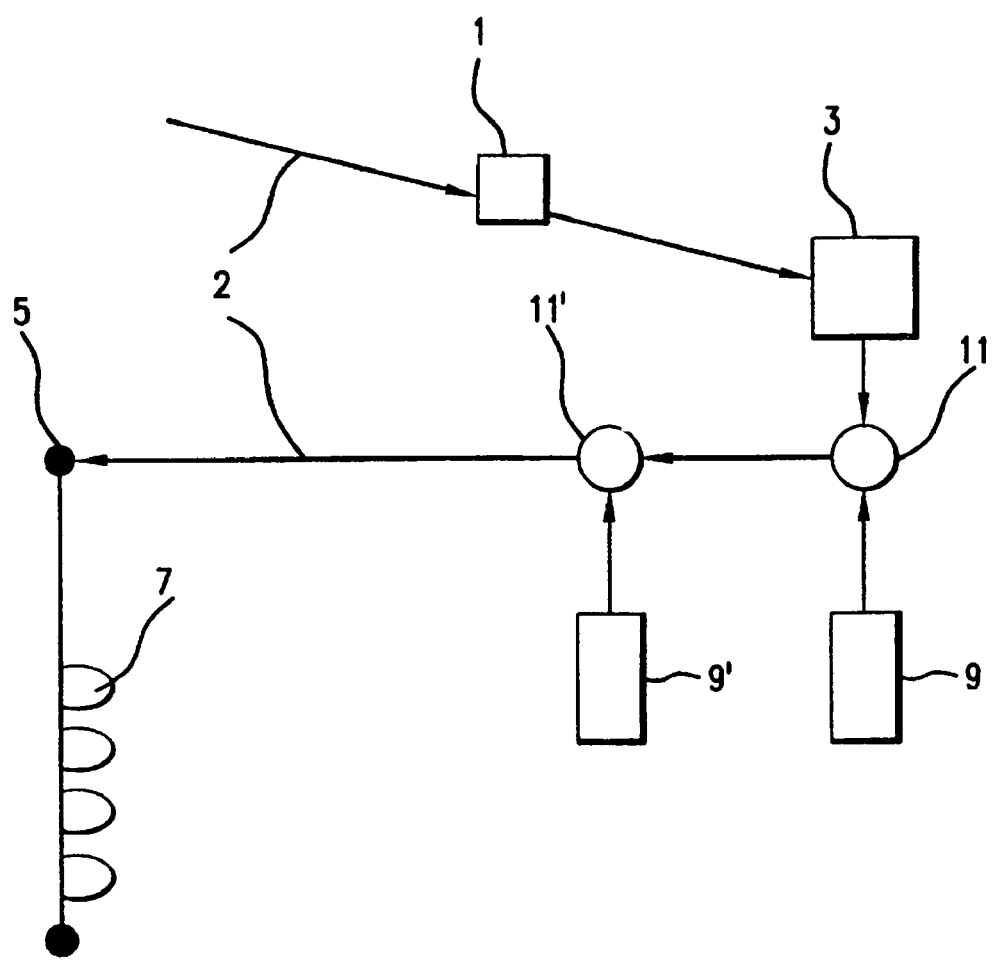

METHOD AND SYSTEM FOR SUPPLYING AMINO ACIDS OR CHEMICAL DERIVATIVES IN LIQUID FORM TO RUMINANT LIVESTOCK

CROSS-REFERENCE TO RELATED APPLICATIONS

This application claims priority to Italian Patent Application No. 2000 A 000785, filed on Aug. 8, 2000, and is a divisional of U.S. application Ser. No. 09/922,939, filed Aug. 7, 2001, now U.S. Pat. No. 6,874,444.

BACKGROUND OF THE INVENTION

1. Field of the Invention

This invention relates to a procedure and a system for supplying amino acids or chemical derivatives in liquid form to ruminant livestock.

2. Related Art

For years now, amino acids, the basic components of proteins, have represented the most economical and efficient means for adapting the protein composition of the diets of animals bred for productive purposes to the increasing needs dictated by genetic improvement and the qualitative demands of the market for products of animal origin.

Consequently, amino acids, particularly lysine, methionine, threonine and tryptophan, are commonly added to fodder, in variable amounts according to the amino acid composition of the base feed and of the required nutritional objectives.

Amino acids of industrial origin come from chemical synthesis or fermentation processes, and are available to the animal feed industry either in powder or liquid form, chemically formulated either as natural-like amino acids or as various chemical derivatives, which are then metabolized by the animal in biologically active amino acids.

The ruminant species (especially bovines, and to a lesser degree sheep, goats and buffalo) cannot, however, benefit from these additions to their diet, which they need from a nutritional point of view, because the rumen, acting as a biological fermentor, transforms the amino acids added to the fodder, using them as components in culture material for the bacterial and protozoan populations which are its natural inhabitants.

In order to solve the problem of the ruminal degradability of the amino acids added to the fodder, the industry has proposed several forms of amino acid "rumen protection," which are able to make them non-assailable by the bacterial flora of the rumen but at the same time bioavailable (that is, absorbable by the animal) in the part of the digestive system responsible for absorbing nutrients (the intestine). These technologies range from simply covering the amino acids with lipid films with a high melting point to sophisticated techniques of the pharmaceutical type which provide for including amino acids in micropellets covered with pH-sensitive polymers or rumen-resistant cellulose, as well as other means. Generally speaking, either the techniques are relatively economical but not very efficient, such as lipid films which provide approximately 10-40% protection against the rumen, or are fairly efficient but costly in proportion to the value of the protected product, such as micropellets which provide approximately 60-90% protection against the rumen but the cost of the technology is often greater than the value of the amino acid.

BRIEF SUMMARY OF THE INVENTION

The purpose of this invention is to solve the problem of the cost-benefit relationship in treating the diet of ruminant livestock with appropriate doses of amino acids by using a specific method of administration which allows a degree of ruminal bypass to be achieved using the most economical form of amino acids available on the market, that is, the liquid form, without subjecting it to any subsequent reworking, but rather supplying it directly to the animals.

Thus, starting from a raw material whose cost is not high, more consistent doses may be used, benefitting from the bypassed part as a nutritional supplement, the remaining part being metabolized by the bacteria of the rumen to boost their vitality.

In addition, by using these nutritional supplements directly in the housing structures, their dosage may be adapted by the producer very rapidly, in terms of the composition of the base portion.

The above and other purposes and advantages of the invention, which will become apparent by following the description, are applied to a procedure and a system such as those described. Preferred embodiments and important variants of this invention are also presented.

BRIEF DESCRIPTION OF THE DRAWINGS/FIGURES

The foregoing and other features and advantages of the present invention will be apparent from the following, more particular description of a preferred embodiment of the invention, as illustrated in the accompanying drawings in which:

FIG. 1 is a schematic block diagram of the system of the present invention for supplying amino acids in liquid form to ruminant livestock.

DETAILED DESCRIPTION OF THE PREFERRED EMBODIMENTS

A preferred embodiment of the present invention is now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

One aspect of this invention is a system for administering amino acids in a liquid mixture to ruminant livestock. The administration is through a liquid such as the animals' drinking water, milk replacers, or liquid feed after the amino acid is diluted in the liquid. The dilution occurs immediately, since it is a matter of hydrosoluble products, and the relatively low percentage of inclusion in the drinking water or other liquid necessary for obtaining useful dosages prevents potential chemical incompatibility problems between the various amino acids, and does not affect the palatability of the liquid itself. The percentage of inclusion of the amino acid in the liquid may be from about 0.01% to about 10.0%. In a more preferred embodiment, the percentage of inclusion of the amino acid in the liquid may be from about 0.05% to about 0.5%. In a most preferred embodiment, the percentage of inclusion of the amino acid in the liquid may be from about 0.1% to about 0.3%. In order to dilute the liquid amino acids, a relatively simple system is needed, a preferred and non-limiting form of which is illustrated in FIG. 1.

Typical amino acids include alanine, beta-alanine, arginine, asparagine, aspartic acid, carnitine, citrulline, cysteine, cystine, gamma-aminobutryic acid, glutamic acid, glutathione, glycine, histidine, hydroxyproline, isoleucine, leucine, lysine, methionine, ornithine, phenylalanine, proline, serine, taurine, threonine, tryptophan, tyrosine and valine. In a preferred embodiment, the supplied amino acid may be lysine, methionine, threonine or tryptophan. In a most preferred embodiment, the amino acid to be supplied is lysine or methionine in their liquid forms.

FIG. 1 is a schematic block diagram of a preferred embodiment of the present invention. The system of FIG. 1 includes a fluid supply line (2) used in breeding livestock and at least one one-way valve (1) connected to the line (2). The valve (1) prevents the return of amino acids from the fluid distribution system. As shown in FIG. 1, the system further includes a measurement device (3), such as a flowmeter or liter-counter, connected to the line (2) downstream from the one-way valve (1). The system also includes at least one pump (5) for injecting the amino acids into the fluid system, and is equipped with a gradient for regulating the projected flow for the livestock, activated by the measurement device (3). Every time the liquid from the system passes through after it is activated by the animals using one or more drinking troughs (7), it injects a known and anticipated amount of each amino acid in the liquid pipeline. The amino acids are contained in containers such as vats (9, 9'), and are drawn up by appropriate devices (11, 11') and introduced into the flow of liquid towards drinking troughs (7).

Ruminants, especially in the bovine species, have an automatic physiological reflex defined as an "esophageal pipe" which, when it perceives liquids such as drinking water, milk replacers, or liquid feed passing through the esophagus, partially closes off with a muscle reflex the access of the liquids themselves to the first stomach (rumen). This is accomplished by closing a specific muscle channel, which sends the water directly to the abomasum (fourth stomach), for all purposes similar to the monogastric stomach.

This reflex has an almost total efficiency in young animals, because it is provided by nature as a safeguard against suckling milk falling into the rumen, where it would create anomalous fermentations dangerous to the life of the young animal. Part of this reflex persists into the adult life of ruminants, even though with a much lower efficiency.

A specific study (Woodford S T, Murphy M R, Davis C L, Holmes K R, "Ruminal Bypass of Drinking Water in Lactating Cows," *J. Dairy Science*, October 1984; 67 (10) 2471-2474) has shown that up to 18% of ingested liquids are able to bypass the rumen in the hours immediately after feeding. Based on this principle, the present invention provides for using liquids as a means of supplying ruminant livestock with a considerable amount of amino acids, whether natural-like or chemical derivatives, in a liquid and therefore especially economical form.

Moreover, the ruminal persistence time of fluids is much shorter (typically less than about 10 hours) with respect to the persistence time of solid fractions (typically about 15-20 hours). Therefore, even the part of the amino acids supplied in a liquid which does not bypass the rumen through the esophageal pipe reflex has a briefer time of contact with the bacterial and protozoan flora of the rumen, introducing a time control factor in the changes resulting from being subjected to modifications of the fermentative type.

A method for supplying liquid products to ruminant livestock is simple and efficient. The method first involves calculating the daily consumption of liquid by the animals. This calculation may be performed by means of known nutritional formulas (Murphy M R et al., "Factors Affecting Water Consumption by Holstein Cows in Early Lactation," *J. Dairy Science,* 66:35 (1983)) or, when present, by verifying the data offered by a measurement device such as a liter-counter found in the equipment. In a preferred embodiment, drinking water may be supplied from about 30 liters/day/head to about 150 liters/day/head. In a more preferred embodiment, drinking water may be supplied from about 50 liters/day/head to about 80 liters/day/head. In a most preferred embodiment, drinking water may be supplied from about 70 liters/day/head to about 80 liters/day/head.

Then, the amount of amino acids whose administration to the animals is desired is calculated based on bioavailability data. In a preferred embodiment, the amount of amino acid to be supplied to each animal may be from about 10 grams to about 500 grams. In a more preferred embodiment, the amount of amino acid to be supplied to each animal may be from about 30 grams to about 300 grams. In a most preferred embodiment, the amount of amino acid to be supplied to each animal may be from about 35 grams to about 200 grams.

Next, the percentage of inclusion of each amino acid per liter of liquid is calculated, based on the amino acid concentration found in the commercial product whose use is intended. In a preferred embodiment, the percentage of inclusion of each amino acid per liter of liquid is between about 0.01% to about 10.0%. In a more preferred embodiment, the percentage of inclusion of the amino acid in the liquid may be from about 0.05% to about 0.5%. In a most preferred embodiment, the percentage of inclusion of the amino acid in the liquid may be from about 0.1% to about 0.3%.

Finally, the method includes titering the system by means of gradients installed on every individual pump. An example of this method is provided in Example 2.

Supplementing the diet of ruminants, especially bovines, with high levels of amino acids, particularly lysine and methionine, allows specific productive results to be obtained. For example, supplementation in dairy cattle or brood cows increases both the liters of milk produced per day and the protein content in the milk produced. This also improves the overall health of the animals as a result of a better balanced feeding by producing a reduction in ketosis, lowering of somatic cells, providing better immune status, and more efficient reproductive performances. Supplementing the diet of buffalo, sheep and/or goats with high levels of amino acids produces the same advantages as stated above for bovines.

Supplementation in beef cattle increases production quantitatively, measured by grams of increased weight per day, and by improving the quality of the carcass through the percentage of total lean cuts and the corporal development of the commercially valuable parts. This also improves the health condition of the beef cattle as a result of a better balanced feeding, resulting in a better health response in the phase and lower incidence of disease during the breeding cycle.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

EXAMPLE 1

The following study, performed using liquid lysine supplied in a 60-gram amino acid dose in a liquid drench to two bovines, gave the following response curves in the plasma level of the lysine, which is an index of its absorption by the animals, and illustrates that the esophageal muscle reflex is active:

| Sampling Time (minutes) | Cow 1, plasma lysine (mg/100 ml) | Cow 2, plasma lysine (mg/100 ml) |
|---|---|---|
| 0 | 1 | 1.073 |
| 80 | 1.13 | 1.079 |
| 160 | 1.243 | 1.365 |
| 240 | 1.613 | 2.245 |
| 360 | 1.727 | 2.422 |
| 420 | 1.75 | 2.415 |
| 148 | 1.97 | 1.999 |
| 540 | 1.928 | 1.700 |
| 600 | 1.54 | 1.422 |
| 24 hours | 1.44 | 1.200 |

EXAMPLE 2

The following is an example of a calculation for supplying the proper amount of liquid products to ruminant livestock. This calculation can be easily executed by special, simple computerized support, which may be furnished as a complement to the system of the invention.

Mean amino acid bioavailability: 20%
Mean bovine water consumption: 62.5 L/head/day
Nutritional lysine requirements: 20 g/head/day
Nutritional methionine requirements: 7 g/head/day
Commercial liquid lysine: 50% amino acid titer
Commercial liquid methionine: 88% hydroxy analog amino acid titer

| | Lysine | Methionine |
|---|---|---|
| Liters of $H_2O$ drunk/cow/day | 62.5 | 62.5 |
| Bioavailable amino acid requirement | 20 grams | 7 g |
| Grams to be supplied based on 20% bioavailability (k = 5) | 100 g | 35 g |
| Grams to be supplied based on commercial product concentration (x) | 200 g (50%) | 40 g (88%) |
| Grams of amino acid required per liter of water (x:62.5) | 3.2 | 0.64 |
| Percentage to be titered on the equipment mark | 0.32% | 0.064% |

EXAMPLE 3

In this example, 24 milking Holstein cows (8 primiparous and 16 multiparous) were used (Table 1). Animals were allotted to four treatment groups (6 animals each group) in a Latin square design and treated according to Table 2.

Each period of the Latin square had an adjustment period of 7 days (base diet) and a treatment period of 14 days (base diet plus amino acid supplementation for treatments T2, T3 and T4). Liquid amino acids were dosed into the drinking water (treatment T3) using individual volumetric pumps to avoid mixing of undiluted products. Tables 3-7 report the base diet and feed composition.

Blood and milk samples were collected during the adjustment and experimental periods according to Table 8. Blood samples were collected before morning meal, then centrifuged and plasma was collected for lysine and methionine determination. Milk samples were collected in two consecutive milkings from all cows using a lactometer, refrigerated at 4° C. and analyzed for fat, protein and lactose content. The data was analyzed by a General Linear Model ("GLM") procedure using the values from the first adjustment period as a covariate.

Table 9 reports the average water consumption of animals being supplemented liquid amino acids within the drinking water by week.

The following products were used:
SMARTAMINE™ ML: rumen protected amino acid with a pH dependent co-polymer (vinil-2-piridin-stirene) (available from Rhone Poulenc Animal Nutrition, Atlanta, Ga.)
39% Lysine+15% Methionine,
Bioavailability: 90%
Protection: 90% into water solution, pH 6, 40° C., 24 hours.
RHODIMET™ AT 88 (Rhone Poulenc): liquid methionine hydroxy analogue (pH: 1)
DL-2-idroxy-4-methyltiobutanoic acid.
$[CH_3-S-CH_2-CH_2-CH(OH)-COOH]$
Methionine hydroxy analogue: 88%
ADM liquid Lysine, L-Lysine (ADM Bioproducts, Germany)
Lysine: 50%
Ph: 9.5-10.5 fd

TABLE 1

Animal used in the lactating Holstein cows experiment

| Box | Tag | Days in Milk | Milk, kg |
|---|---|---|---|
| 1 | 256 | 36 | 32 |
| 1 | 265 | 91 | 31 |
| 1 | 482 | 206 | 21 |
| 1 | 459 | 221 | 32 |

TABLE 1-continued

Animal used in the lactating Holstein cows experiment

| Box | Tag | Days in Milk | Milk, kg |
|---|---|---|---|
| 1 | 42 | 229 | 23 |
| 1 | 782 | 323 | 24 |
| 2 | 284 | 43 | 34 |
| 2 | 233 | 68 | 25 |
| 2 | 1 | 121 | 31 |
| 2 | 220 | 220 | 27 |
| 2 | 244 | 298 | 22 |
| 2 | 120 | 328 | 28 |
| 3 | 257 | 61 | 30 |
| 3 | 3 | 81 | 28 |
| 3 | 179 | 108 | 35 |
| 3 | 224 | 224 | 31 |
| 3 | 54 | 273 | 24 |
| 3 | 508 | 368 | 19 |
| 4 | 272 | 67 | 29 |
| 4 | 421 | 89 | 31 |
| 4 | 491 | 94 | 35 |
| 4 | 95 | 225 | 19 |
| 4 | 241 | 243 | 24 |
| 4 | 29 | 356 | 26 |

TABLE 2

Treatments

| | |
|---|---|
| T1 - Control | Base diet with no amino acid addition |
| T2 - Product mixed within the total mixed ratio | Base diet + 68 g/head/day Smartamine ML (26 g Lysine; 10.2 g Methionine) |
| T3 - Liquid product added to the drinking water | 200 g/head/day ADM liquid lysine + 35 g/head/day Rhodimet |
| T4 - Liquid amino acids sprayed on top of the total mixed ratio | 200 g/head/day ADM liquid lysine + 35 g/head/day Rhodimet |

TABLE 3

Diet composition (as fed)

| Feed | Kg/head/day |
|---|---|
| Corn Silage | 22 |
| Alfalfa hay dehydrate | 3.5 |
| Grass hay | 2 |
| Concentrate | 9.5 |
| Energy mix (corn meal 70%, barley meal 30%) | 1.5 |

TABLE 4

Chemical composition of the total mixed ratio (% on dry matter basis)

| Parameters | Value |
|---|---|
| Dry matter, Kg | 21.7 |
| Crude protein, % | 15.72 |
| $NE_l$, Mcal/kg | 1.63 |
| Starch and sugars, % | 26.5 |
| NDF (neutral detergent fiber) | 35.5 |
| ADF (acid detergent fiber) | 21.5 |

Forage/Concentrate ratio: 45/55

TABLE 5

Chemical composition of feeds

| Parameter | Corn silage | Alfalfa hay, dehydrate | Grass hay |
|---|---|---|---|
| Dry matter | 28 | 90 | 87 |
| Crude protein | 9.5 | 17.4 | 13 |
| Soluble protein, % CP | 55 | 40 | 35 |
| Lipids | 3.42 | 0.87 | 1.7 |
| NDF | 47.5 | 44 | 63.5 |
| ADF | 28 | 27 | 46 |
| Starch | 23.5 | — | — |
| Sugars | — | 2.5 | 1.5 |

TABLE 6

Concentrate feed composition

| Component | % on dry matter basis |
|---|---|
| Mineral and vitamin | 0.32 |
| Megalac | 2.68 |
| $CaCO_3$ | 1.13 |
| Sunflower meal, solvent extracted | 7.26 |
| Soybean meal, solvent extracted | 12.40 |
| Corn meal (10% corn flakes) | 18.03 |
| Barley meal | 16.28 |
| Potato protein concentrate | 4.06 |
| Beet pulps, dry | 11.79 |
| Molasses | 1.69 |
| Wheat bran | 12.89 |
| Corn gluten feed | 8.20 |
| $NaHCO_3$ | 0.56 |
| NaCL | 0.34 |
| $CaHPO_4$ | 1.58 |
| MgO | 0.79 |

TABLE 7

Chemical composition of concentrate

| Parameter | % on dry matter basis |
|---|---|
| Dry matter, kg | 88.74 |
| UFL | 1.05 |
| Crude protein | 21.94 |
| Crude fiber | 8.68 |
| NDF | 24.80 |
| Lipids | 5.10 |
| UIP | 8.93 |
| Soluble protein | 5.48 |
| NSC | 38.30 |
| Starch | 28.27 |
| Starch + sugar | 33.63 |
| PDIE | 14.07 |
| PDIN | 15.58 |
| P | 0.88 |
| C | 1.46 |

TABLE 8

Days of blood and milk samples collection

| Blood | Milk | Blood | Milk |
|---|---|---|---|
| 7 | 6 | 3 | 6 |
|  | 7 | 14 | 7 |
|  |  |  | 13 |
|  |  |  | 14 |

TABLE 9

Water consumption (liter/day)

| Period (by week) | (Liter/head/day) | Amino acid in drinking water |
|---|---|---|
| 3 | 78.0 | No |
| 2 | 75.0 | Yes |
| 3 | 76.0 | Yes |
| 4 | 75.0 | No |
| 5 | 78.0 | Yes |
| 6 | 65.3 | Yes |
| 7 | 64.3 | No |
| 8 | 59.0 | Yes |
| 9 | 65.8 | Yes |
| 10 | 62.7 | No |
| 11 | 65.2 | Yes |
| 12 | 60.4 | Yes |

TABLE 10

Plasma lysine concentration (mg/100 ml) at day 0, 3 and 14

| Day | T1 | T2 | T3 | T4 |
|---|---|---|---|---|
| 0 | 0.947 | 0.935 | 0.948 | 0.969 |
| 3 | 1.001 | 1.343 | 1.126 | 1.224 |
| 14 | 0.916 | 1.232 | 1.080 | 1.239 |

TABLE 11

Plasma methionine concentration (mg/100 ml) at day 0, 3 and 14

| Day | T1 | T2 | T3 | T4 |
|---|---|---|---|---|
| 0 | 0.255 | 0.272 | 0.271 | 0.259 |
| 3 | 0.323 | 0.417 | 0.302 | 0.325 |
| 14 | 0.264 | 0.376 | 0.312 | 0.352 |

TABLE 12

Production data, first week of the Latin square experimental trial

| Parameter | T1 | T2 | T3 | T4 |
|---|---|---|---|---|
| Milk, kg | 29.2 | 2.97 | 28.9 | 28.9 |
| 4% fat corrected milk, kg | 25.8 | 26.5 | 27.1 | 26.1 |
| Fat, kg | 0.93 | 0.97 | 1.05 | 0.98 |
| Protein, kg | 0.97 | 0.99 | 0.96 | 0.98 |
| Lactose, kg | 1.56 | 1.58 | 1.52 | 1.51 |
| Fat, % | 3.17 | 3.37 | 3.69 | 3.42 |
| Protein, % | 3.37 | 3.36 | 3.36 | 3.41 |
| Lactose, % | 5.32 | 5.29 | 5.24 | 5.22 |

TABLE 13

Production data, second week of the Latin square experimental trial

| Parameter | T1 | T2 | T3 | T4 |
|---|---|---|---|---|
| Milk, kg | 29.0 | 29.2 | 28.7 | 29.2 |
| 4% fat corrected milk, kg | 26.6 | 26.1 | 27.0 | 28.1 |
| Fat, kg | 0.99 | 0.96 | 1.04 | 1.10 |
| Protein, kg | 0.97 | 0.97 | 0.94 | 1.02 |
| Lactose, kg | 1.54 | 1.55 | 1.49 | 1.54 |

TABLE 13-continued

Production data, second week of the Latin square experimental trial

| Parameter | T1 | T2 | T3 | T4 |
|---|---|---|---|---|
| Fat, % | 3.43 | 3.51 | 3.85 | 3.84 |
| Protein, % | 3.38 | 3.40 | 3.37 | 3.50 |
| Lactose, % | 5.29 | 5.30 | 5.16 | 5.24 |

What is claimed is:

1. A process for supplying amino acids or their chemical derivatives in liquid form to ruminant livestock, the process comprising:
   supplying a liquid in a supply line;
   measuring a flow of liquid in the supply line;
   supplying at least one amino acid in liquid form;
   producing a liquid mixture by injecting a known amount of the liquid form of the at least one amino acid into the flow of liquid in said supply line, wherein the known amount injected is regulated by a gradient activated by the measured flow of said liquid in said supply line; and
   administering said liquid mixture to ruminant livestock in a controlled manner.

2. The process according to claim 1, wherein said step of supplying a liquid further comprises supplying a liquid selected from the group consisting of drinking water, milk replacers and liquid feed.

3. The process according to claim 1, wherein said at least one amino acid is selected from the group consisting of lysine, methionine, threonine and tryptophan.

4. The process according to claim 1, wherein said at least one liquid amino acid is selected from the group consisting of lysine and methionine.

5. The process according to claim 1, wherein said step of producing a mixture further comprises mixing said at least one amino acid in a dosage ranging from about 0.05% to about 0.5% based on the liquid supplied.

6. The process according to claim 1, wherein said step of administering said mixture further comprises the following steps:
   calculating the daily liquid consumption of the ruminant livestock;
   calculating the amount of amino acid to be supplied to the ruminant livestock;
   calculating the percentage of inclusion of each amino acid per liter of liquid based on the amino acid concentration; and
   titering the system of administration.

7. The process according to claim 6, wherein said daily liquid consumption calculation phase is performed using nutritional formulas.

8. The process according to claim 6, wherein said daily liquid consumption calculation phase is performed using a measurement device.

9. The process according to claim 8, wherein said measurement device is selected from the group consisting of a flow meter and a liter-counter.

10. The process according to claim 1, further comprising the steps of performing and controlling the phase of administering the liquid mixture.

* * * * *